United States Patent
Nakane et al.

(10) Patent No.: US 7,138,699 B2
(45) Date of Patent: Nov. 21, 2006

(54) SEMICONDUCTOR INTEGRATED CIRCUIT AND NONCONTACT INFORMATION MEDIUM

(75) Inventors: George Nakane, Nara (JP); Tatsumi Sumi, Osaka (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 128 days.

(21) Appl. No.: 10/527,083

(22) PCT Filed: Sep. 8, 2003

(86) PCT No.: PCT/JP03/11467

§ 371 (c)(1), (2), (4) Date: Mar. 10, 2005

(87) PCT Pub. No.: WO2004/025551

PCT Pub. Date: Mar. 25, 2004

(65) Prior Publication Data

US 2006/0022041 A1 Feb. 2, 2006

(30) Foreign Application Priority Data

Sep. 11, 2002 (JP) .............................. 2002-265518

(51) Int. Cl.
*H01L 29/00* (2006.01)

(52) U.S. Cl. ..................... 257/497; 235/492; 455/182.2

(58) Field of Classification Search ................ 257/295, 257/298, 303, 497; 235/449, 487, 492; 455/130, 455/150.1, 182.1, 182.2

See application file for complete search history.

(56) References Cited

U.S. PATENT DOCUMENTS 5,404,587 A * 4/1995 Okanobu ................. 455/182.2
6,525,362 B1 * 2/2003 Sadayuki .................... 257/298

FOREIGN PATENT DOCUMENTS

| JP | 9-147070 | 6/1997 |
| JP | 10-240889 | 9/1998 |
| JP | 2001-86666 | 3/2001 |
| JP | 2002-236890 | 8/2002 |

* cited by examiner

*Primary Examiner*—Brook Kebede
(74) *Attorney, Agent, or Firm*—McDermott Will & Emery LLP

(57) ABSTRACT

A semiconductor integrated circuit includes a supply voltage generator for rectifying a signal received by an antenna coil and generating a supply voltage set at a predetermined voltage by a regulator, and a demodulator. The demodulator includes a demodulation circuit for demodulating an input signal and outputting the demodulated input signal, a resistor whose one end is connected to one end of the antenna coil, a diode whose anode is connected to the other end of the resistor and whose cathode is connected to a node located to the input end of the demodulation circuit, a first capacitance connected between a node at which the resistor and the diode are connected to each other and a grounding conductor, and a second capacitance connected between a node at which the diode and the demodulation circuit are connected to each other and a grounding conductor.

4 Claims, 5 Drawing Sheets

SEMICONDUCTOR INTEGRATED CIRCUIT AND NONCONTACT INFORMATION MEDIUM

TECHNICAL FIELD

The present invention relates to a semiconductor integrated circuit and a non-contact information medium equipped with the semiconductor integrated circuit.

BACKGROUND ART

In recent years, non-contact information media, such as IC cards (smart cards), have been put into practical use. Such media supply power via radio waves by utilizing a mutual induction effect of coils and transmit/receive data.

As examples of non-contact information media, non-contact IC cards are broadly categorized into close-coupled IC cards, proximity IC cards, vicinity IC cards, and microwave IC cards based on the communication distances between the IC cards and readers/writers for transmitting/receiving radio waves to/from the IC cards. More particularly, the close-coupled IC cards have a communication distance of 0 through 2 mm, the proximity IC cards have a communication distance of 0 through 10 cm, the vicinity IC cards have a communication distance of 0 through 70 cm, and the microwave IC cards have a communication distance of 0 through 10 m. The international standardization of each type of the IC cards has been almost prepared. Technical difficulty increases with an increase in the communication distance. The close-coupled IC cards do not have any significant difference in their characteristics from already widely used contact IC cards. Therefore, it cannot be said that good use is made of the merits of non-contact IC cards. Accordingly, it is proximity non-contact IC cards that are expected to be widely used immediately after the contact IC cards.

The proximity IC cards that can be used at a distance of 0 through 10 cm from readers/writers may be quite extensively applicable. For example, if the proximity IC cards are used for commuter passes, information exchanges between the proximity IC cards and readers/writers in a non-contact manner allow the opening/closing of ticket gates of stations to be controlled without the need to take the IC cards out of commuter-pass holders at the ticket gates.

In order that the IC cards can extensively be applied, it is significant to make the IC cards smaller and lighter. It is expected that the more extensively the IC cards are applicable, the less care will be taken in handling the IC cards. Therefore, in view of less susceptibility to malfunction from rough handling, non-contact information media, such as IC cards, have normally been mounted with semiconductor integrated circuits each including a complicated circuit in a small area.

The following performance is demanded for semiconductor integrated circuits for non-contact IC cards. Supply voltages required to operate internal digital circuits (logic circuits) and nonvolatile memories with stability must be generated even at a distance of approximately 0 through 10 cm from the readers/writers to the non-contact IC cards, thereby obtaining stable demodulated signals. More particularly, when the distance between a reader/writer and a non-contact IC card is a short distance of 0 cm, i.e., the non-contact IC card is very close to the reader/writer, the integrated circuit mounted in the non-contact IC card will be broken unless the supply voltage supplied to the internal digital circuit and the nonvolatile memory is below specification (for example, 5.5 volts or less for 5-volt tolerant integrated circuits). Furthermore, in order to obtain a stable demodulated signal, the input voltage to the demodulation circuit need be prevented from reaching an overvoltage.

DISCLOSURE OF INVENTION

In view of the above, an object of the present invention is to provide a semiconductor integrated circuit that can set an input voltage to a demodulation circuit at or below an acceptable value and demodulate data with stability independently of the change of the communication distance. This ensures a necessary supply voltage.

In order to solve the above problem, a semiconductor integrated circuit of the present invention comprises: a supply voltage generator for rectifying a signal received by an antenna coil and generating a supply voltage set at a predetermined voltage by a regulator; and a demodulator, wherein the demodulator comprises: a demodulation circuit for demodulating an input signal and outputting the demodulated input signal; a resistor whose one end is connected to one end of the antenna coil; a diode whose anode is connected to the other end of the resistor and whose cathode is connected to a node located to the input end of the demodulation circuit; a first capacitance connected between a node at which the resistor and the diode are connected to each other and a grounding conductor; and a second capacitance connected between a node at which the diode and the demodulation circuit are connected to each other and a grounding conductor.

According to the semiconductor integrated circuit device of the present invention, it is possible to provide a semiconductor integrated circuit that prevents an input voltage to the demodulation circuit from reaching an overvoltage and can demodulate data with stability independently of the change of the communication distance. This ensures a necessary supply voltage.

In the semiconductor integrated circuit of the present invention, the resistor is preferably formed of a polysilicon interconnect.

This can facilitate fabrication process steps for semiconductor.

A non-contact information medium of the present invention comprises: an antenna coil for receiving an ASK (amplitude shift keying) signal obtained by ASK modulating a carrier wave based on digital data; a supply voltage generator for rectifying a signal received by the antenna coil and generating a supply voltage set at a predetermined voltage by a regulator; and a demodulator, wherein the demodulator comprises: a demodulation circuit for demodulating an input signal; a resistor whose one end is connected to one end of the antenna coil; a diode whose anode is connected to the other end of the resistor and whose cathode is connected to a node located to the input end of the demodulation circuit; a first capacitance connected between a node at which the resistor and the diode are connected to each other and a grounding conductor; and a second capacitance connected between a node at which the diode and the demodulation circuit are connected to each other and a grounding conductor.

This makes it possible to provide a non-contact information medium that prevents an input voltage to the demodulation circuit from reaching an overvoltage and can demodulate data with stability independently of the change of the communication distance.

In the non-contact information medium of the present invention, the resistor is preferably formed of a polysilicon interconnect.

This can facilitate fabrication process steps for semiconductor.

BEST MODE FOR CARRYING OUT THE INVENTION

An embodiment of the present invention will be described hereinafter with reference to the drawings.

First, a description will be given of an exemplary structure of a non-contact IC card mounted with a semiconductor integrated circuit.

Figure 1:
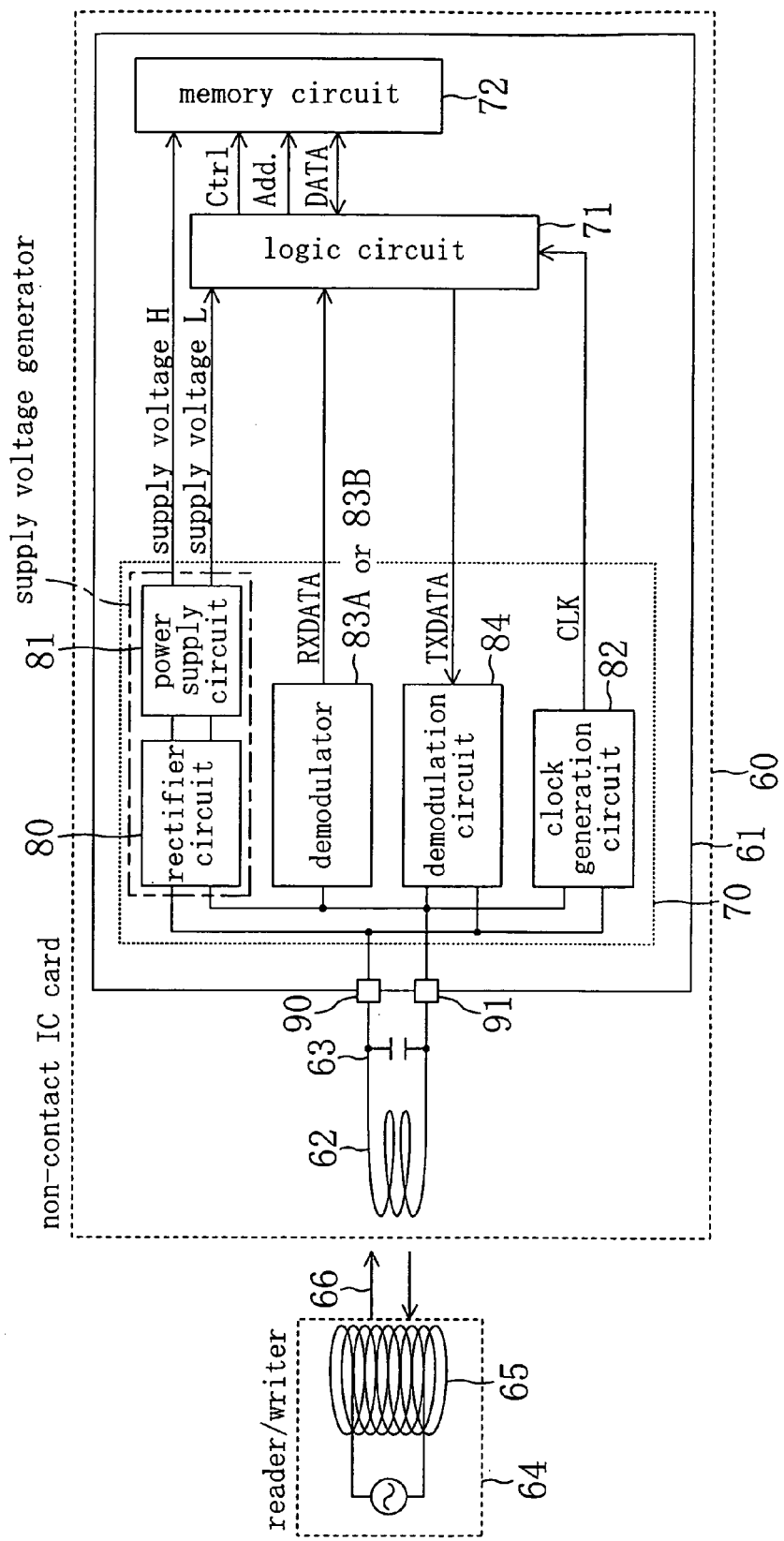
FIG. 1 is a block diagram showing an exemplary structure of a non-contact IC card.

FIG. 1 is a block diagram showing exemplary structures of a non-contact IC card and a reader/writer.

A non-contact IC card 60 shown in FIG. 1 comprises an LSI 61 for the non-contact IC card 60 (hereinafter, referred to as "integrated circuit 61"), an antenna coil 62, and a capacitance 63 for tuning (hereinafter, referred to as "tuning capacitance 63").

The integrated circuit 61 comprises an analog circuit 70, a logic circuit 71, a memory circuit 72, and other components. The antenna coil 62 is connected to pads 90 and 91 of the integrated circuit 61. A radio wave 66 delivered from an antenna coil 65 of the reader/writer 64 is transmitted/received between the antenna coils 62 and 65. The antenna coil 62 is connected also to the tuning capacitance 63 as shown in FIG. 1. When the antenna coil 62 receives an ASK (amplitude shift keying) signal (a radio wave 66) into which a carrier is ASK modulated based on digital data, an alternating voltage is generated between the ends of the antenna coil 62 (between the pads 90 and 91). The alternating voltage produced between the ends of the antennal coil 62 is supplied to the analog circuit 70 located in the integrated circuit 61.

The analog circuit 70 comprises a rectifier circuit 80, a power supply circuit 81, a clock generation circuit 82, a demodulator 83B, a modulation circuit 84, and other components. In the analog circuit 70, the rectifier circuit 80 and the power supply circuit 81 produces a supply voltage L for operating the logic circuit 71 and a supply voltage H for operating the memory circuit 72.

The clock generation circuit 82 generates a clock CLK using, as an input signal, the alternating voltage produced between the ends of the antenna coil 62. The logic circuit 71 and the memory circuit 72 are operated by the clock CLK.

Data transmitted/received between the non-contact IC card 60 and the reader/writer 64 are sent while being superposed on a radio wave (alternating voltage). Therefore, when the non-contact IC card 60 receives data from the reader/writer 64, data RXDATA are obtained by demodulating the data received by the demodulator 83B located in the non-contact IC card 60. On the other hand, when the non-contact IC card 60 transmits data to the reader/writer 64, data TXDATA to be transmitted are modulated by the modulation circuit 84.

The data transmitted/received between the non-contact IC card 60 and the reader/writer 64 as described above are translated by the logic circuit 71. The translated data are stored in the memory circuit 72 with their addresses and data specified. The stored data are read by designating their addresses.

Figure 2:
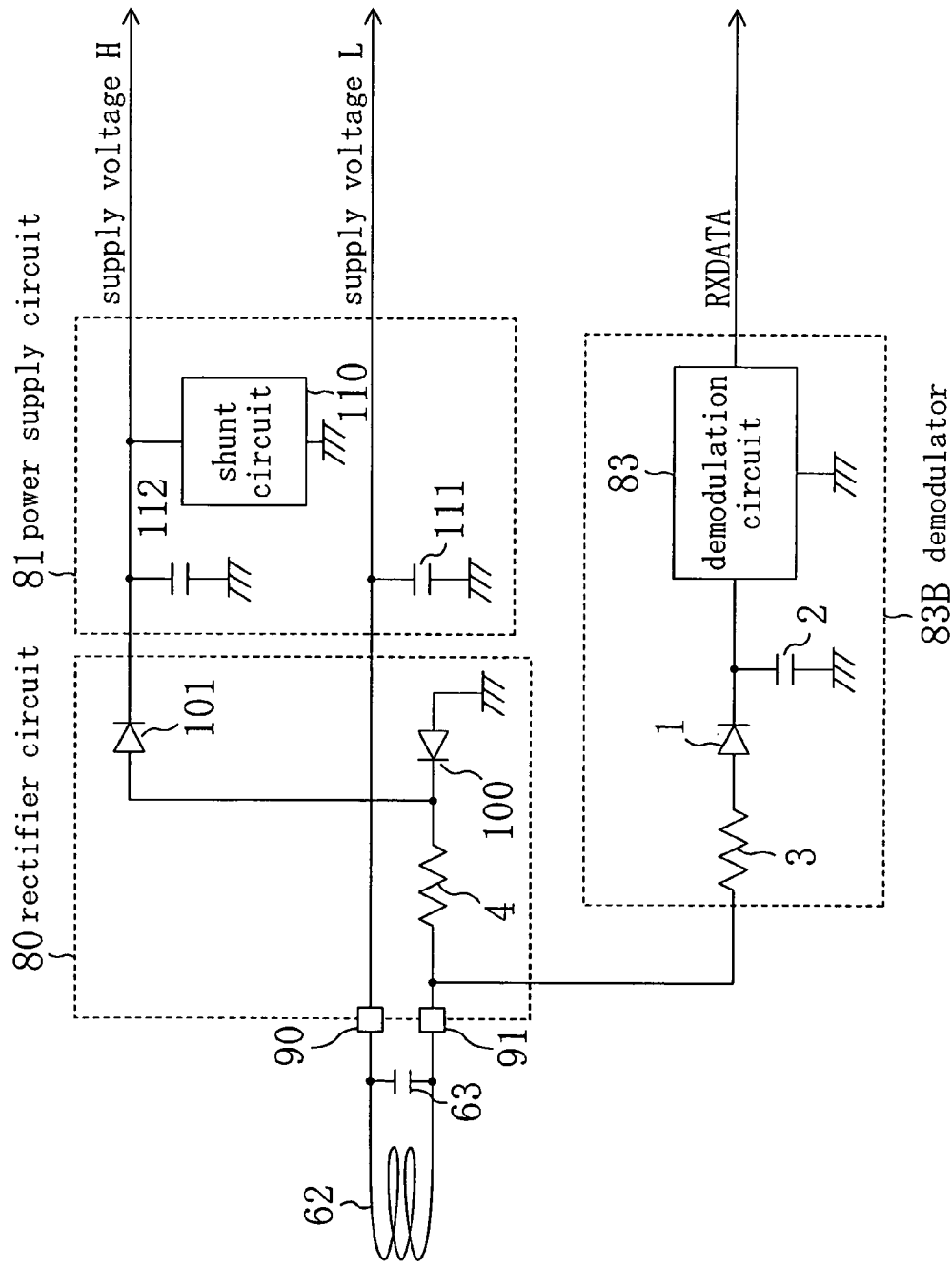
FIG. 2 is a block diagram showing an exemplary structure of a semiconductor integrated circuit mounted in the non-contact IC card.

FIG. 2 is a diagram for specifically explaining the rectifier circuit 80, the power supply circuit 81, the demodulator 83B in the analog circuit 70.

As shown in FIG. 2, an alternating voltage produced between the ends of an antenna coil 62 are fed to the rectifier circuit 80 through pads 90 and 91. The rectifier circuit 80 includes diodes 100 and 101 and serves as a voltage-doubler rectifier circuit.

The power supply circuit 81 includes a shunt circuit 110 (corresponding to a regulator) and smoothing capacities 111 and 112. The shunt circuit 110 clamps a supply voltage H to a predetermined voltage.

Figure 3:
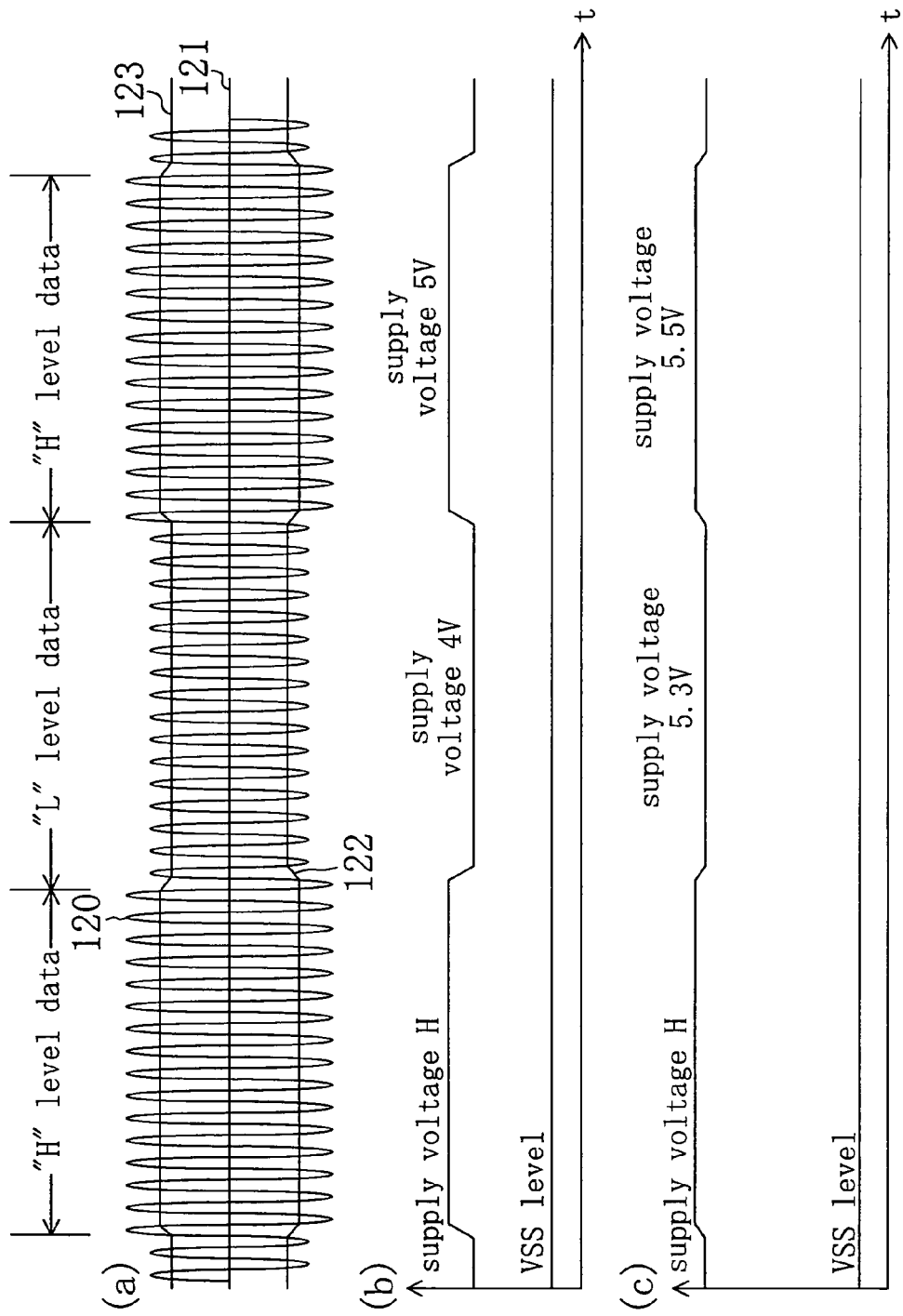
FIGS. 3(a) through 3(c) are block diagrams for explaining the operation of a rectifier circuit.

FIG. 3 is a diagram for explaining the operating principals of the rectifier circuit 80.

FIG. 3(a) is a diagram showing an alternating voltage 120 produced at the antenna coil 62 in transmitting ASK-modulated data from the reader/writer 64 at a transmission frequency of 13.56 MHz used for communications with the non-contact IC card 60, wherein a voltage with reference to the pad 90 is designated as a voltage 121.

Assume that digital data are ASK modulated and the ASK-modulated data are transmitted from the reader/writer 64 using an encoding scheme NRZ. In this case, when the reader/writer 64 transmits "H" level data, the alternating voltage 120 produced between the ends of the antenna coil 62 has a high level. When the reader/writer 64 transmits "L" level data, the alternating voltage 120 produced between the ends of the antenna coil 62 has a low level.

A description will be given below of how the alternating voltage 120 produced between the ends of the antenna coil 62 produces a supply voltage. For the sake of simplification, the voltage 121 produced at a terminal of the pad 90 is considered as a reference voltage.

A negative voltage 122 (supply voltage L) is produced by the diode 100 in the rectifier circuit 80. The supply voltage L is smoothed by the smoothing capacitance 111. A positive voltage 123 (supply voltage H) is produced by the diode 101 in the rectifier circuit 80. The supply voltage H is smoothed by the smoothing capacitance 112.

Even when the radio wave 66 delivered from the reader/writer 64 is constant, the alternating voltage 120 produced between the ends of the antenna coil 62 (between the pads 90 and 91) varies. The reason for this is that the distance between the non-contact IC card 60 and the reader/writer 64 varies. More particularly, when the reader/writer 64 comes into close contact with the non-contact IC card 60, this increases the level of the alternating voltage 120. On the other hand, when the reader/writer 64 is away from the non-contact IC card 60, this decreases the level of the alternating voltage 120.

As an example, consider the above with reference to the international standard for non-contact IC cards, ISO14443 (the standard for proximity non-contact IC cards having a communication distance of approximately 10 cm). When the non-contact IC card 60 comes into close contact with the reader/writer 64, the radio wave 66 received by the noncontact IC card 60 is five through ten times as intensive as when the communication distance is approximately 10 cm, though the intensity of the radio wave 66 received by the non-contact IC card 60 depends also on the shapes of both the antenna coil 65 of the reader/writer 64 and the antenna coil 62 of the non-contact IC card 60. In view of the above, assuming that the consumed power of the integrated circuit 61 is constant independently of the voltage, the supply voltage changes to five through ten times that when the communication distance is approximately 10 cm.

More particularly, on condition that the voltage 123 reaches approximately 4 volts when the distance between the non-contact IC card 60 and the reader/writer 64 is 10 cm, if the non-contact IC card 60 and the reader/writer 64 comes into close contact at 0 cm, the supply voltage 123 reaches 20 or more volts so that the built-in integrated circuit 61 is broken.

In order to prevent the integrated circuit 61 from being broken, the shunt circuit 110 clamps the supply voltage 123, thereby seemingly increasing the consumed current of the integrated circuit 61.

Figure 4:
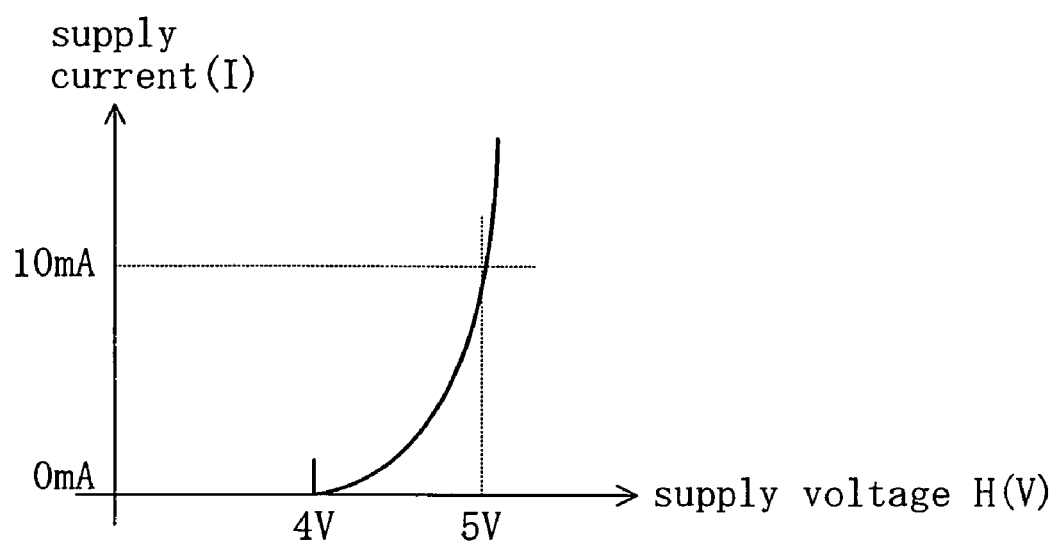
FIG. 4 is a graph showing voltage-current characteristics of a shunt circuit.

FIG. 4 is a diagram showing voltage-current characteristics of the shunt circuit 110.

When a MOS transistor is used as a final-stage transistor that determines the voltage-current characteristics in the shunt circuit 110 and the supply voltage becomes a predetermined threshold voltage or larger, the current expressed by a square function of the voltage passes through the shunt circuit 110. When a bipolar transistor is used instead and the supply voltage becomes a predetermined threshold voltage or larger, the current expressed by an exponential function of the voltage passes through the shunt circuit 110. Referring to FIG. 4, while a supply voltage 123 of 4 volts hardly causes the passage of current, a supply voltage 123 of 5 volts causes the passage of a current of 10 mA. In other words, the shunt circuit 110 has the following supply-voltage characteristics: when a large current passes through the shunt circuit 110, the change in the supply voltage is reduced.

FIG. 3(b) is a diagram showing the change in supply voltage when the distance between the non-contact IC card 60 and the reader/writer 64 communicable with each other is a long distance.

When "H" level data are transmitted from the reader/writer 64, a supply voltage H is at a high level (approximately 5 volts). On the other hand, when "L" level data are transmitted therefrom, the supply voltage H is at a low level (approximately 4 volts).

FIG. 3(c) is a diagram showing the change in supply voltage when the distance between the non-contact IC card 60 and the reader/writer 64 communicable with each other is a short distance.

When "H" level data are transmitted from the reader/writer 64, a supply voltage H is at a high level (approximately 5.5 volts). On the other hand, when "L" level data are transmitted therefrom, the supply voltage H is at a low level (approximately 5.3 volts).

More particularly, as shown in FIG. 3(c), the shunt circuit 110 increases the supply current to be passed therethrough with an increase in the supply voltage H. Therefore, the increase in the supply voltage H enhances the ability of the shunt circuit 110 to allow current to flow. This suppresses changes of the supply voltage H and prevents the supply voltage H from reaching an overvoltage.

In addition, as shown in FIG. 2, the insertion of a resistor 4 in the input side of the rectifier circuit 80 enhances the suppression of the supply voltage using the shunt circuit 110. An input voltage to the demodulation circuit 83 can be set at or below a predetermined voltage by inserting a resistor 3 in the input end of the demodulator 83B.

Thus, in order that the non-contact IC card 60 can be operated with stability at a short distance from the reader/writer 64, the upper limit of the supply voltage H is suppressed by the shunt circuit 110 serving as a regulator to prevent the supply voltage from increasing and further the current supplying ability of the rectifier diode 101 can be suppressed by the resistor 4. This can allow the range of the supply voltage to be set at or below an acceptable value.

Although the input voltage to the demodulation circuit 83 can be set at or below a predetermined voltage by inserting the resistor 3 in the input end of the demodulator 83B, it is difficult for the demodulation circuit 83 to demodulate data with stability. The reason for this is that a data signal component fed to the demodulation circuit 83 is decayed. In order to make the voltage supplied to the input end of the demodulation circuit 83 small, a direct current must be allowed to pass through the demodulator 83B after feeding the voltage to the demodulator 83B. This causes power transmitted from the reader/writer 64 to be wastefully consumed. As a result, a current passing through the power supply circuit 81 decreases. This makes it difficult for the integrated circuit to obtain a sufficient supply voltage at a long distance from the reader/writer 64. As described above, an integrated circuit of a typical structure cannot still ensure a stable data demodulation and a sufficient supply voltage.

In this relation, in light of the above, an integrated circuit of an embodiment of the present invention will be described hereinafter.

Figure 5:
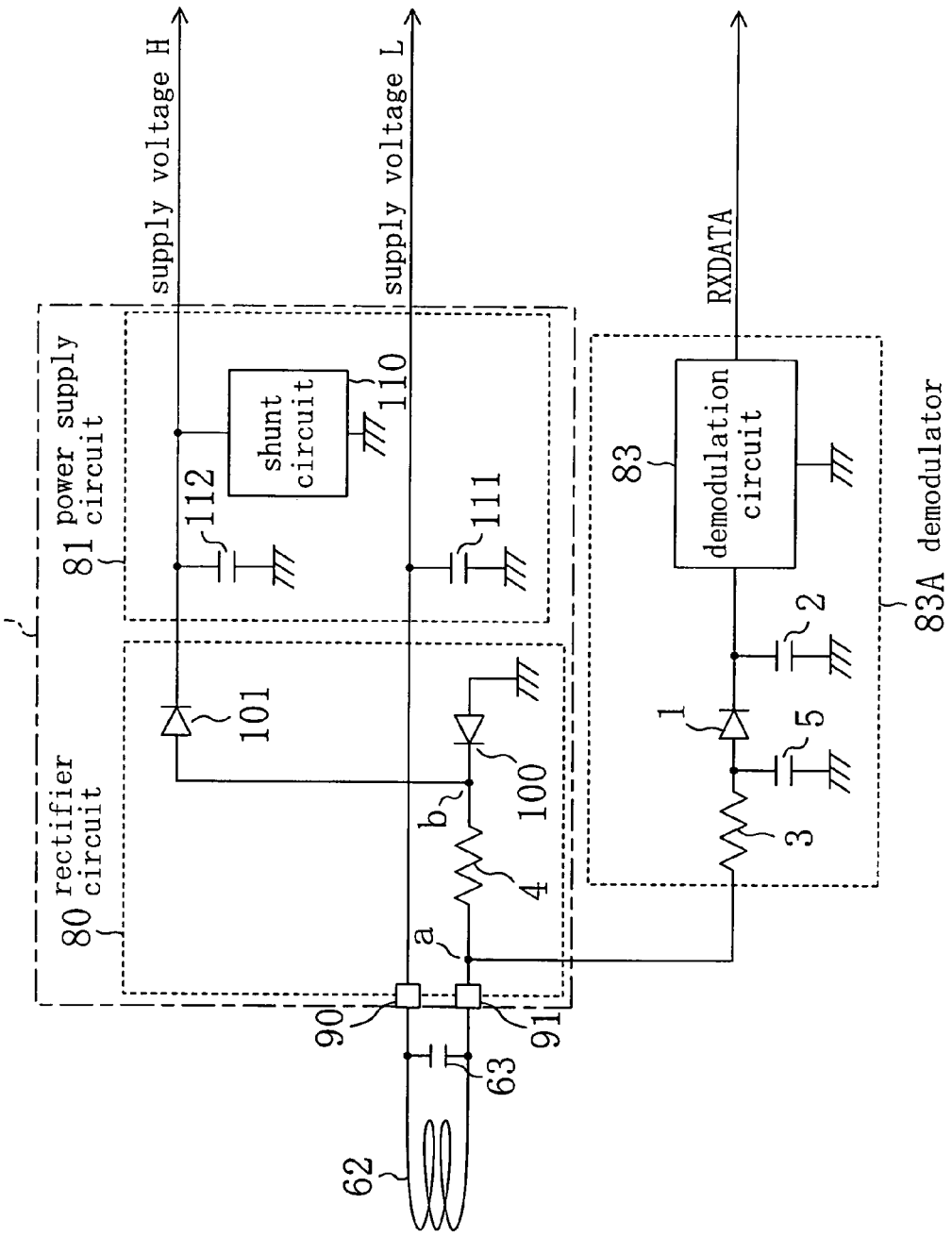
FIG. 5 is a block diagram for explaining a semiconductor integrated circuit according to an embodiment of the present invention.

FIG. 5 is a block diagram for explaining a semiconductor integrated circuit 61 in a non-contact IC card 60 serving as a non-contact information medium according to the embodiment of the present invention. A rectifier circuit 80, a power supply circuit 81 and a demodulator 83A located in an analog circuit 70 are specifically shown. Components in common with those of FIGS. 1 and 2 are denoted by the same numerals.

Unlike the demodulator 83B shown in FIG. 3, the demodulator 83A shown in FIG. 5 includes a capacitance 5 provided to the input end of the demodulation circuit 83 and between the interconnection point between a resistor 3 and a diode 1 and a grounding conductor.

More particularly, as shown in FIG. 5, a pad 91 of the integrated circuit 61 is connected to a node a located at one end of a resistor 4, and a node b located at the other end of the resistor 4 is connected to the cathode of the diode 100 and the anode of the diode 101. Furthermore, the input end of the demodulator 83A is also connected to the node a interconnecting the pad 91 and the resistor 4. That is, a node located at one end of the resistor 3 is connected to the node a, and the capacitance 5 is connected to a node located at the other end of the resistor 3.

The resistor 3 of the demodulator 83A is formed of an interconnect such as polysilicon. This facilitates fabrication process steps for a semiconductor integrated circuit.

When a radio wave 66 transmitted from a reader/writer 64 is fed to the demodulator 83A, a high-frequency component (13.56 MHz) is blocked by a low-pass filter formed of the resistor 3 and the capacitance 5, thereby adjusting the radio wave 66 to allow the passage of the frequency of a data component (106 kbps). In this way, only the data component passes through the diode 1 and is smoothed by the smoothing capacitance 2. The smoothed data component is fed to the demodulation circuit 83.

Since in this way a low-pass filter is formed of passive elements, i.e., the resistor 3 and the capacitance 5, the data component is decayed, thereby obtaining a stable demodulated signal. Since the overvoltage produced at the input end of the demodulation circuit 83 can arbitrarily be reduced to or below a predetermined voltage by removing the high-frequency component (13.56 MHz), this can prevent the input voltage of the demodulation circuit 83 from reaching an overvoltage. This eliminates the need for allowing a direct current to pass through the demodulator 83A. Therefore, it becomes possible for the integrated circuit to obtain a sufficient supply voltage in the power supply circuit 81 at a long distance from the reader/writer 64.

Since as described above in this embodiment a low-pass filter composed of a resistor 3 and a capacitance 5 is formed to the input end of the demodulation circuit 83, this prevents the amplitude of a data signal fed to the demodulation circuit 83 from decaying. This makes it possible to demodulate data with stability and reduce the voltage supplied to the input end of the demodulation circuit 83 to or below an acceptable value by removing the high-frequency component.

In view of the above, the non-contact IC card 60 can allow the supply voltage and the input voltage to the demodulation circuit 83 to be reduced to or below an acceptable value at both a long distance and a short distance from the reader/writer 64. This makes it possible to provide a semiconductor integrated circuit that can demodulate data with stability independently of the change of the communication distance.

In this embodiment, a description was given of the case where the rectifier circuit 80 serves as a voltage-doubler rectifier circuit. However, even if the rectifier circuit 80 serves as a full-wave rectifier circuit or a half-wave rectifier circuit, the present invention can be carried out likewise.

INDUSTRIAL APPLICABILITY

As described above, the semiconductor integrated circuit of the present invention prevents the input voltage of the demodulation circuit from reaching an overvoltage and can demodulate data with stability independently of the change of the communication distance. This makes it possible for the integrated circuit to ensure a sufficient supply voltage. The entire semiconductor integrated circuit can be stably operated without requiring a large-scale circuit. Therefore, it is useful to apply the present invention to non-contact information media, such as IC cards.

The invention claimed is:

1. A semiconductor integrated circuit comprising:
a supply voltage generator for rectifying a signal received by an antenna coil and generating a supply voltage set at a predetermined voltage by a regulator; and
a demodulator,
wherein the demodulator comprises:
a demodulation circuit for demodulating an input signal and outputting the demodulated input signal;
a resistor whose one end is connected to one end of the antenna coil;
a diode whose anode is connected to the other end of the resistor and whose cathode is connected to a node located to the input end of the demodulation circuit;
a first capacitance connected between a node at which the resistor and the diode are connected to each other and a grounding conductor; and
a second capacitance connected between a node at which the diode and the demodulation circuit are connected to each other and a grounding conductor.

2. The semiconductor integrated circuit of claim 1, wherein the resistor is formed of a polysilicon interconnect.

3. A non-contact information medium comprising:
an antenna coil for receiving an ASK (amplitude shift keying) signal obtained by ASK modulating a carrier wave based on digital data;
a supply voltage generator for rectifying a signal received by the antenna coil and generating a supply voltage set at a predetermined voltage by a regulator; and
a demodulator,
wherein the demodulator comprises:
a demodulation circuit for demodulating an input signal;
a resistor whose one end is connected to one end of the antenna coil;
a diode whose anode is connected to the other end of the resistor and whose cathode is connected to a node located to the input end of the demodulation circuit;
a first capacitance connected between a node at which the resistor and the diode are connected to each other and a grounding conductor; and
a second capacitance connected between a node at which the diode and the demodulation circuit are connected to each other and a grounding conductor.

4. The non-contact information medium of claim 3, wherein the resistor is formed of a polysilicon interconnect.

* * * * *